United States Patent [19]
Bendixen et al.

[11] Patent Number: 5,561,845
[45] Date of Patent: Oct. 1, 1996

[54] APPARATUS AND METHOD FOR PRESERVING COVERAGE IN AN OVERLAPPING COVERAGE AREA

[75] Inventors: Arne B. Bendixen, Lynchburg; Michael W. Evans, Forest; Samuel A. Leslie, Forest; Mark M. Sihlanick, Forest, all of Va.

[73] Assignee: Orion Industries, Inc., Solon, Ohio

[21] Appl. No.: 955,511

[22] Filed: Oct. 2, 1992

[51] Int. Cl.$^6$ ..................................................... H04Q 7/00
[52] U.S. Cl. ........................ 455/33.4; 455/54.1; 455/58.2; 379/59
[58] Field of Search ................................. 455/33.4, 34.1, 455/34.2, 54.1, 54.2, 56.1, 33.1, 33.2, 33.3, 58.2; 379/59, 60, 63

[56] References Cited

U.S. PATENT DOCUMENTS

| | | | |
|---|---|---|---|
| 4,737,978 | 4/1988 | Burke et al. | 379/60 |
| 4,790,000 | 12/1988 | Kinoshita | 379/59 |
| 4,905,301 | 2/1990 | Kropp et al. | 455/33.4 X |
| 4,916,460 | 4/1990 | Powell et al. | 343/853 |
| 4,941,200 | 7/1990 | Leslie et al. | 455/17 |
| 5,214,789 | 5/1993 | George | 455/33.4 X |
| 5,287,545 | 2/1994 | Kallin | 455/58.2 |

OTHER PUBLICATIONS

Trade journal article entitled "Southwestern Bell, Matsushita/Panasonic Develop PCS System: It Uses Cellular Frequencies For Wireless PBX/Centrex, Switches To Conventional Cellular Outside", publication unknown, Dec. 27, 1991, pp. 3-4.

Primary Examiner—Reinhard J. Eisenzopf
Assistant Examiner—Philip J. Sobutka
Attorney, Agent, or Firm—Dressler, Goldsmith, Milnamow & Katz, Ltd.

[57] ABSTRACT

A system which improves coverage in overlapping coverage areas between two type-A or type-B cellular radio telephone systems is able to direct a subscriber unit in the overlapping coverage area to the home or primary system, thereby minimizing the subscriber unit's roaming-type expenses. The system includes a control channel receiver, a control unit, and a control channel transmitter/receiver pair, in combination with a transmit/receive antenna. The system transmits a control channel, which is associated with the home system, into the overlapping region. The control channel is intended to be the strongest channel in that region. Any subscriber units in the region associated with the home system which respond to that control channel will be directed to other control channels associated with the home system. Those subscriber units will receive service from the home system, as opposed to the foreign system which may provide other strong control channels in the overlapping coverage area.

5 Claims, 2 Drawing Sheets

APPARATUS AND METHOD FOR PRESERVING COVERAGE IN AN OVERLAPPING COVERAGE AREA

FIELD OF THE INVENTION

The invention pertains to radio telephone systems. More particularly, the invention pertains to an apparatus and a method of improving subscriber service where two different systems, having substantially different service areas, have overlapping border areas of coverage.

BACKGROUND OF THE INVENTION

Cellular-type radio telephone systems have become established in metropolitan service areas, and numerous types of businesses have found that such systems can be used to improve customer service. Each service area is usually served by two cellular systems, by convention called A or B. Subscriber mobiles or portable units can discriminate between the two systems. The major metropolitan service areas are usually spaced far enough apart that neither A-type systems nor B-type systems overlap.

Attempts are now being made to install cellular-type systems with broader coverage areas in lower density rural areas. In these installations, A-type or B-type systems may overlap in fringe or border areas of coverage.

A cellular subscriber transceiver, such as a mobile unit or a personal portable unit, is designed to scan for the strongest control channel whenever a call is to be placed, at certain periodic time intervals when the transceiver is initially turned on, or if the signal being received goes below a certain level. If the transceiver is in an area served by more than one cellular system, there is a chance that the strongest control channel which the transceiver detects will be associated with the less desired one of the two systems.

As a result of the scanning process, the subscriber transceiver may lock onto the less desirable system, and place or answer its call there, even if the signal quality from the other system is adequate for a call to be made. This may cause the transceiver user to incur "roamer charges" that will increase the cost of the call. In addition, the revenue for the call is lost to the other carrier.

In the past, the solution to this problem was simple; the transceiver could be programmed to prefer system A or system B. When programmed to prefer system A, for example, the transceiver will lock onto a B system control channel only if no system A control channel is detected. This solution worked well, so long as no overlapping coverage was possible between two A-type systems or two B-type systems.

Currently, adjacent rural cellular systems can create this overlapping coverage. For this situation, prior solutions include:

1. Programming the subscriber transceiver for home only operation. This solution renders the transceiver unsuitable for roaming, though it does solve the overlapping coverage problem;

2. Installing a Type IV cellular repeater. In this solution, the repeater would provide a boosted control channel for the subscriber transceiver to lock onto, solving the overlapping coverage problem. However, such repeaters incorporate hardware to boost the reverse channel back to the donor cell, and require sufficient antenna isolation to operate efficiently; or 3. Installing an extra cell site with improved coverage and additional costs.

The prior solutions thus either limit subscriber service unacceptably, or provide other capabilities that raise their cost. There thus continues to be a need for cost-effective solutions to this problem which do not limit subscriber service.

SUMMARY OF THE INVENTION

In accordance with the invention, an apparatus and a method are provided to improve service to a movable, subscriber transceiver in a region where two service providing radio telephone systems have overlapping coverage. The apparatus, in accordance with the present invention, includes a receiver for receiving signals on at least one control channel, which is assigned to the selected radio telephone system.

This receiver is not limited to receiving the control channel information by RF transmission. Fiber optic cable or wire cable can be used as a transmission medium.

A control channel transmitter can be used to transmit the control channel signals at a higher signal level into the region of overlapping coverage. Although not required, these signals preferably will be transmitted on a different frequency than the receiver frequency to reduce antenna isolation requirements.

Another receiver is provided which is responsive to any communication initiating control signals received from the movable transceiver, which is in the overlapping regions of coverage. A control unit is also provided which is coupled to the receiver and to the transmitter for responding to the received communication initiating signals from the subscriber transceiver.

A response is sent to the subscriber transceiver in the form of a command signal. This command signal directs that transceiver to rescan a set of control channels also associated with the selected system and determine the two with the strongest receiver signal. It also directs the subscriber transceiver to resend the communication initiating signal on one of these control channels.

If desired, the control unit can also analyze the mobile identification number (MIN), which is embedded in the communication initiating signal. The channel list sent to the subscriber unit can be adjusted to take into account the MIN. For example, this response can be based on a prestored list, or can be dependent on the area code or exchange code of the MIN.

A method, in accordance with the present invention, of directing a movable or subscriber transceiver to a selected radio telephone system in a region where coverage of the selected system overlaps coverage of another radio telephone system includes the steps of:

receiving information from the selected system to generate the control channel data stream thereto;

transmitting a forward control channel stream into the region of overlapping coverage; and detecting a communication initiating signal from a movable transceiver in the region and received on a reverse channel associated with the transmitted forward control channel, and, in response thereto, transmitting a control signal on that forward control channel, thereby directing that transceiver to scan a list of different control channels associated with the selected system to find the two best channels on the basis of signal strength.

These and other aspects and attributes of the present invention will be discussed further with reference to the following drawings and accompanying specification.

DETAILED DESCRIPTION OF THE PREFERRED EMBODIMENT

Figure 1:
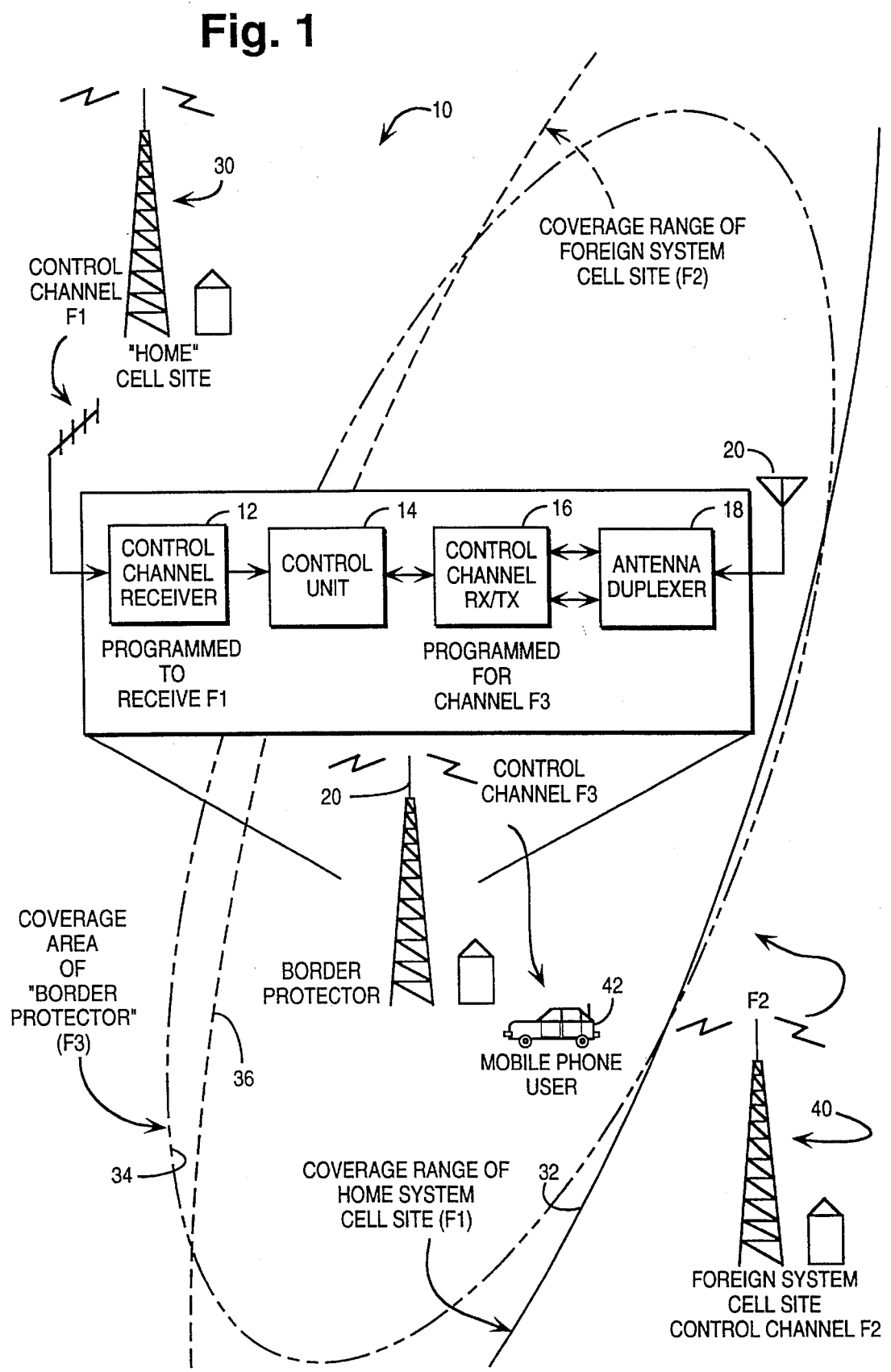
FIG. 1 is an overall block diagram of a system in accordance with the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

FIG. 1 illustrates a block diagram of a system 10 in accordance with the present invention. The system 10 includes a control channel receiver 12 which can be programmed to receive one or more of the predetermined donor control channels. Coupled to the control channel receiver 12 is a control unit 14. The control unit 14 can be implemented as a stored program running on a digital computer.

Coupled to the control unit 14 is a control channel receiver/transmitter unit 16. The control channel receiver/transmitter unit 16 can be as described in EIA Standard IS-20a. Frequency translation can be provided on the transmitter side if desired.

Outputs from and inputs to the control channel receiver/transmitter 16 are coupled to an antenna duplexer 18. The antenna duplexer 18 is in turn coupled to an input/output antenna 20. An input antenna 22 is coupled to the control channel receiver unit 12.

The system 10 can be used in conjunction with a cell site and antenna 30 associated with a home or primary radio telephone system, which can be a cellular A- type or a cellular B-type. The cell site antenna 30 provides coverage over an area bounded by a curve 32. In this region, one or more control channels, represented by control channel F1, a forward and reverse channel, are associated with the home or primary cellular system.

It will be understood that the communication from the home system need not be by cellular transmission. It could also be via microwave transmission, wire or fiber optic cable, or other types of cable without departing from the spirit and scope of the present invention. In such instances, the control channel receiver 12 would include appropriate circuitry to interface to the appropriate transmission medium.

The antenna 20 produces a coverage area 34. In this coverage area, a radiated and translated control channel, control channel F3, a forward/reverse channel pair associated with the home or primary system, is intended to be the strongest control signal in the coverage area 34.

Another coverage area, bounded by curve 36, overlaps in part the coverage area 32 and the coverage area 34. The coverage area, bounded by curve 36, is associated with the foreign or secondary radio telephone system, and is provided by an antenna 40 associated with a cell site for the foreign system. Also associated with the foreign system is a set of one or more control channels of which control channel F2 is a representative channel.

Both the home cell site antenna 30 and the foreign cell site antenna 40 radiate control signals which are associated with the same type of cellular radio telephone systems. That is, each are A-type systems or B-type systems.

In FIG. 1, a subscriber transceiver, illustrated as a mobile phone 42, is operating in the coverage area 34 provided by the system 10. If the unit 42 moves into the region 32 outside of the region 34, it will be serviced from the cell site antenna 30 as is conventional. Similarly, if the unit 40 moves into the coverage region 36 outside of the coverage area 34 of the system 10, it, in all likelihood, will be serviced by the cell site antenna 40 of the foreign system.

Both the home and the foreign system use channels from the same allocation, as both are A-type or B-type systems. For simplicity, only one foreign control channel is shown in FIG. 1. It is understood that this is not a limitation of the invention. In fact, a multiplicity of foreign control channels and cell sites can be accommodated.

The control channel receiver 12 is used to monitor the control channel F1 of the home system as received from the antenna 30. The data on this channel is monitored and retransmitted on channel F3 by the control channel receive/transmit unit 16 under the command of the control unit 14. As noted above, while "over the air monitoring" is described, any method of conveying the control channel information may be used.

The frequencies of F1 and F3 may be the same. For ease of installation due to relaxed antenna isolation requirements, these frequencies will most likely be offset from each other. The system 10 therefor provides a boosted control signal (on forward channel F3) that is designed to be the strongest signal in the desired coverage area 34.

The receiver section of the control channel receive/transmit unit 16 monitors the reverse channel of F3 for call originates or page responses from the subscriber transceiver 42. The processing of these mobile messages is described below.

If a subscriber transceiver 42, is locked onto channel F3, and attempts to make a call, answer a call, or register, it will be sent a "directed retry" message by the system 10, with a list of channels on which to repeat its action. This list is carefully constructed to coincide with the control channel frequencies that are most likely to serve a mobile on its home system in the coverage area 32. When the subscriber unit 42 finds the first acceptable control channel from this list, it will repeat its action and will be serviced in the normal manner by the home system via the cell site antenna 30.

As a further improvement, a subscriber unit's MIN (mobile identification number) can be inspected by the system 10. The list of channels sent with the directed retry by the system 10 can be customized based on this additional information. This response can be based on a lookup list, or dependent on that area code or exchange code in the MIN. For example, a subscriber unit's home system could be deduced from the area code, and assuming overlapping coverage, that unit could be directed to its home system.

Figure 2:
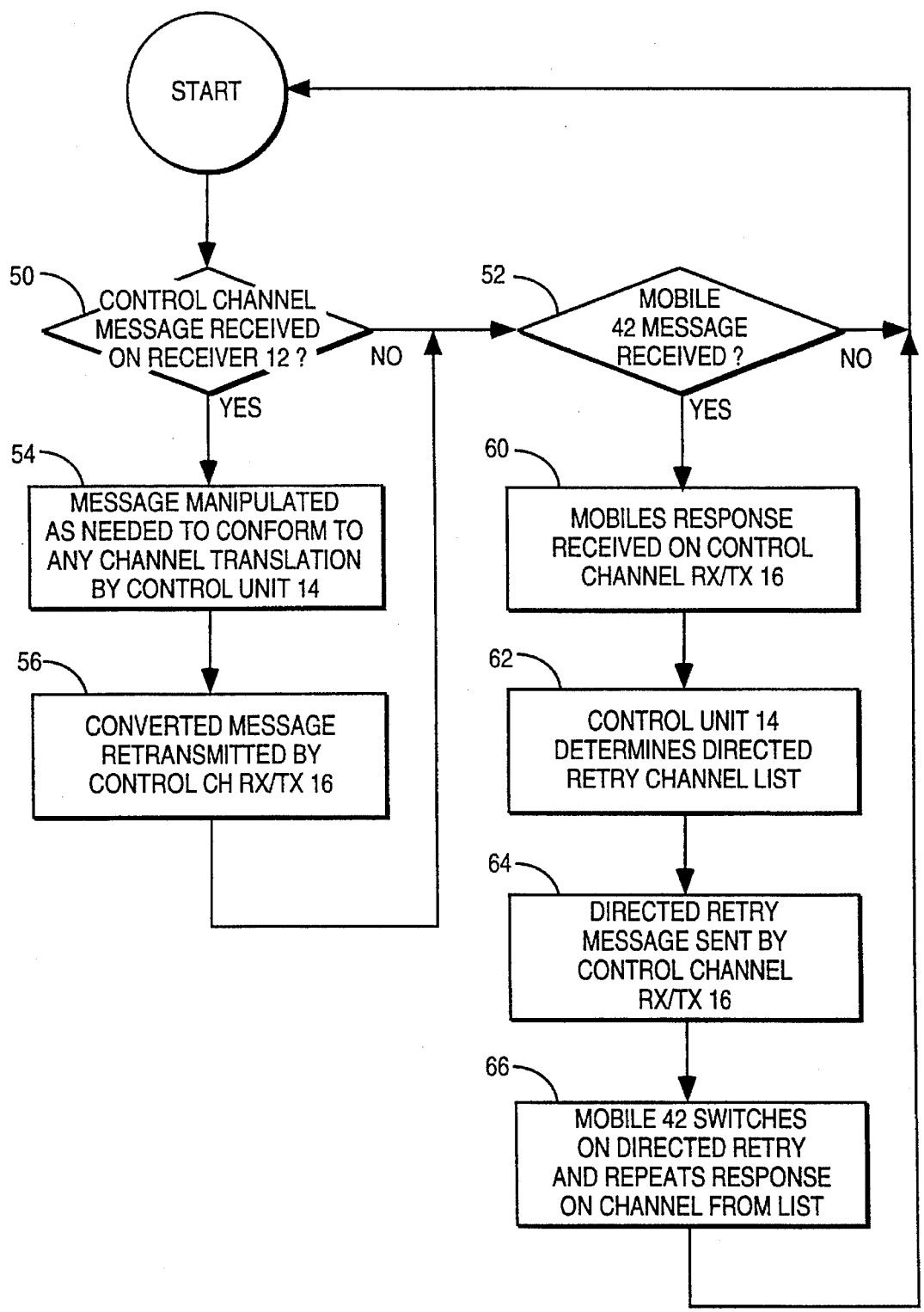
FIG. 2 is a flow diagram of a method in accordance with the present invention.

FIG. 2 is a block diagram which illustrates a method of processing information in accordance with the present invention. In an initial step 50, a determination is made by the control unit 14 as to whether or not a control channel message has been received by receiver 12 from the home cell site antenna 30. If no message has been received, in a step 52, a determination is made as to whether or not a message has been received from the subscriber unit, such as the mobile phone 42. If not, these method steps repeat until either a control channel message is received or a message is received from the subscriber transceiver 42.

Where a control channel message has been received from the home system, in a step 54, the information is extracted by the control unit 14. Subsequently, in a step 56, this information is used to create the control channel stream that is then retransmitted on the forward control channel F3 by the control channel transmitter/receiver pair 16.

In a step 60, a message is received from the subscriber transceiver 42 on the reverse control channel F3. In a subsequent step 62, the control unit 14 determines to which channel or channels the subscriber unit 42 should be directed. In a step 64, the directed retry message is sent by the transmitter/receiver control channel unit 16 on the forward control channel F3 to the subscriber unit 42.

Finally, in a step 66, the subscriber unit 42 switches in response to the directed retry message from the system 10, and repeats that response on a reverse channel associated with the home system. The process then repeats.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. An apparatus for use in a region where cells from two different cellular-type systems provide overlapping coverage for directing a moveable transceiver in the region to receive service from only a selected one of the two cellular systems, associated with one of the two overlapping cells, the apparatus comprising:

a receiver for receiving control channel signals from the cell associated with the selected cellular-type system;

a control unit coupled to said receiver;

a transceiver, coupled to said control unit, for re-transmitting the received control channel signals into the region of overlapping coverage thereby establishing a third coverage region wherein said re-transmitted control channel signal is the strongest such signal in said third coverage area, and wherein said transceiver is responsive to communication initiating control signals received from the moveable transceiver and wherein said control unit, in response to communication initiating signals from the moveable transceiver, determines an identifier for the moveable transceiver: and selects, in response thereto, one or more frequencies associated with the selected cellular-type system to which the moveable transceiver should be directed for service.

2. An apparatus as in claim 1 wherein said control unit includes circuitry for storing a plurality of identifiers for movable transceivers associated with the selected system.

3. An apparatus as in claim 1 wherein the radio telephone systems are cellular-type systems and wherein said receiver receives a selected control channel for the selected system, and wherein said transceiver transmits on a translated control channel assigned to the selected system.

4. An apparatus as in claim 1 wherein said transceiver includes circuitry for translating the received signals to another frequency prior to transmitting.

5. An apparatus as in claim 1 wherein information from the selected system is communicated on a frequency assigned to the selected system by one of a group including microwave, fiber optic cable, or wire cable.

\* \* \* \* \*